United States Patent
Berstis

(10) Patent No.: US 6,721,001 B1
(45) Date of Patent: Apr. 13, 2004

(54) DIGITAL CAMERA WITH VOICE RECOGNITION ANNOTATION

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,313

(22) Filed: Dec. 16, 1998

(51) Int. Cl.$^7$ ................................................. H04N 5/76
(52) U.S. Cl. ................................ 348/231.3; 348/231.6
(58) Field of Search .......................... 348/231.3, 231.4, 348/231.5, 207.1, 211.3, 231.6

(56) References Cited

U.S. PATENT DOCUMENTS

| | | | | |
|---|---|---|---|---|
| 5,546,145 A | * | 8/1996 | Bernardi et al. | 396/312 |
| 5,602,458 A | * | 2/1997 | Dowe | 396/205 |
| 5,692,225 A | | 11/1997 | Bernardi et al. | 396/318 |
| 5,737,491 A | | 4/1998 | Allen et al. | 704/270 |
| 5,940,121 A | * | 8/1999 | Mcintyre et al. | 348/64 |
| 6,031,526 A | * | 2/2000 | Shipp | 345/302 |
| 6,181,883 B1 | * | 1/2001 | Oswal | 396/429 |

* cited by examiner

*Primary Examiner*—Andrew Christensen
*Assistant Examiner*—Tia M. Harris
(74) *Attorney, Agent, or Firm*—Morgan & Finnegan, LLP; Joseph C. Redmond, Jr.

(57) ABSTRACT

A digital camera which allows voice annotations to be recorded for each picture, but which includes text annotations with each such picture when the picture is transmitted from the camera. The digital camera includes an image sensing apparatus operable to receive light comprising an image and output image data representing the image, a first memory operable to store the image data, a sound sensing apparatus operable to receive a sound and output sound data representing the sound, wherein the sound is speech and the sound data is voice data, a second memory operable to store the voice data, a third memory operable to store text data; and a voice recognition apparatus operable to access the second memory, translate the stored voice data into text data and store the text data in the third memory, when the digital camera is provided with external power. In one embodiment, the voice recognition apparatus includes a microprocessor operable to execute image capture routines, voice recording routines and voice recognition routines. The microprocessor may be further operable to execute data transfer routines.

21 Claims, 5 Drawing Sheets

Fig. 1
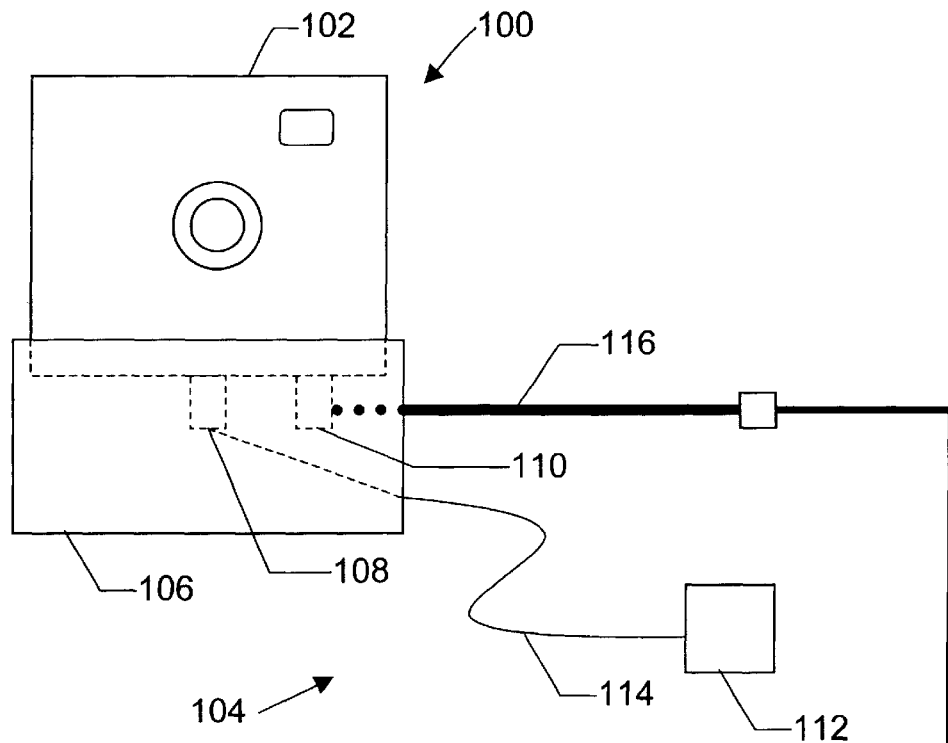
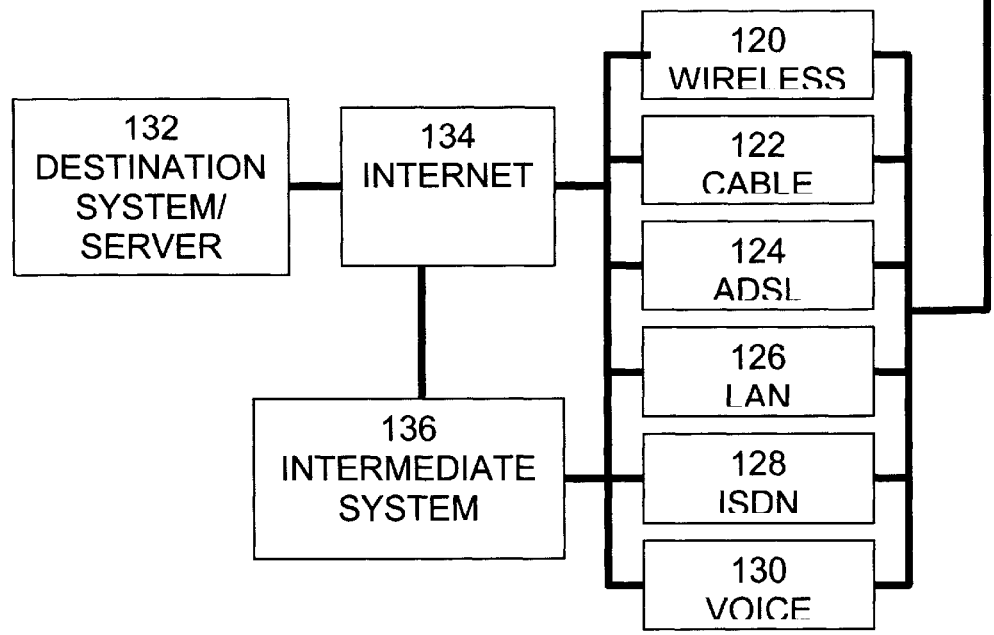

DIGITAL CAMERA WITH VOICE RECOGNITION ANNOTATION

FIELD OF THE INVENTION

The present invention relates to electronic photography, and in particular to a digital camera that translates recorded voice annotations to text annotations when external power is provided.

BACKGROUND OF THE INVENTION

Digital cameras have become popular for both professional and amateur photography. As digital cameras have become more popular, their sophistication has increased, allowing additional features. For example, some digital cameras allow the user to record voice annotations. However, when the pictures are printed, the voice annotations are lost, since recorded voice cannot be usefully displayed on a printed picture. A need arises for a way in which a voice annotation may be recorded when a picture is taken, but a text annotation is included with the picture when it is printed or transmitted.

SUMMARY OF THE INVENTION

The present invention is a digital camera which allows voice annotations to be recorded for each picture, but which includes text annotations with each such picture when the picture is transmitted from the camera. The digital camera of the present invention includes an image sensing apparatus operable to receive light comprising an image and output image data representing the image, a first memory operable to store the image data, a sound sensing apparatus operable to receive a sound and output sound data representing the sound, wherein the sound is speech and the sound data is voice data, a second memory operable to store the voice data, a third memory operable to store text data; and a voice recognition apparatus operable to access the second memory, translate the stored voice data into text data and store the text data in the third memory, when the digital camera is provided with external power. Because the voice to text translation process is compute-intensive, and thus, power-consuming, the translation is deferred until external power is provided.

The present invention may further include an I/O adapter operable to access the first memory and the third memory and transmit the stored image data and the stored text data, when the digital camera is communicatively connected to an external device.

It is preferred that the image data represent a picture, the recorded voice data represent a voice annotation associated with the picture, and the text data is a text annotation associated with the picture.

In one embodiment, the voice recognition apparatus includes a microprocessor operable to execute image capture routines, voice recording routines and voice recognition routines. The microprocessor may be further operable to execute data transfer routines.

In one embodiment, external power and communications connections are provided by a cradle assembly.

BRIEF DESCRIPTION OF THE DRAWINGS

The details of the present invention, both as to its structure and operation, can best be understood by referring to the accompanying drawings, in which like reference numbers and designations refer to like elements.

FIG. 1 shows a digital camera system 100, according to the present invention.

DETAILED DESCRIPTION OF THE INVENTION

Figure 2:
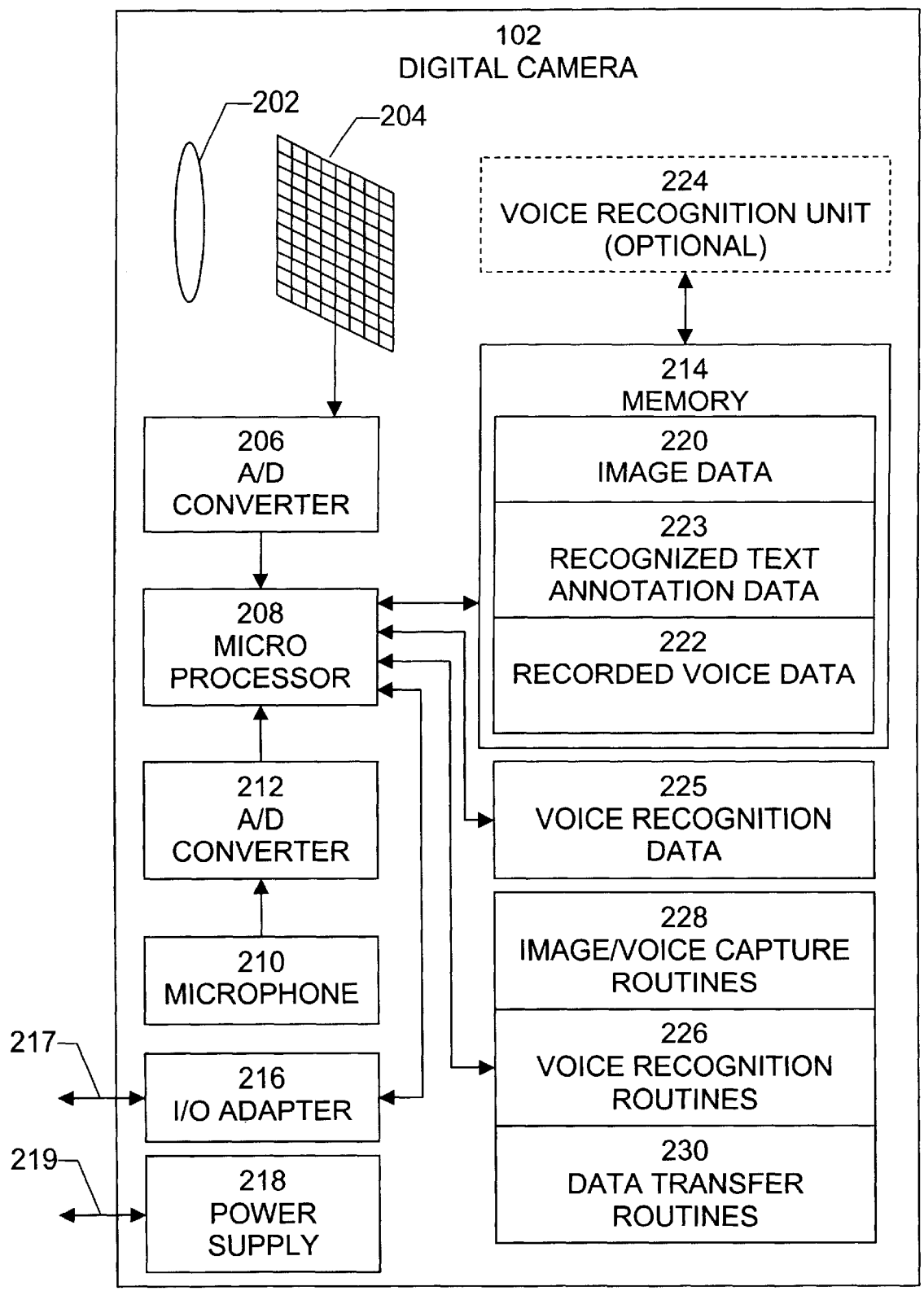
FIG. 2 is an exemplary block diagram of a digital camera shown in FIG. 1.

A digital camera system 100, according to the present invention, is shown in FIG. 1. System 100 includes digital camera 102 and cradle assembly 104. Cradle assembly 104 includes cradle 106, which receives camera 102, allowing attachment of the cradle to the camera. Cradle assembly 104 includes power connector 108 and data connector 110, which provide power and data connections to camera 102 during the recharging, data transfer and voice recognition processes. Power is supplied to power connector 108 by power supply 112 via power cable 114. Power supply 112 may be a wall-mounted device, an automotive power adapter, or a battery-powered device. Data may be transferred via data cable 116, which connects to data connector 110, and which provides communicative connection to an external device, such as a personal computer 119, or to a communication device, such as wireless system 120, cable modem 122, asymmetric digital subscriber line (ADSL) modem 124, local area network interface device 126, integrated services digital network (ISDN) interface device 128, or voice line modem 130. Wireless system 120 includes a modem and wireless transceiver communicatively connected to a wireless network. The recharging, data transfer and voice recognition processes are performed when the camera is returned to the cradle after pictures are taken and voice annotations are recorded.

In one embodiment, communication devices 120–130 provide direct access to destination computer system or server 132 over the Internet 134. In another embodiment, communication devices 120–130 provide access to an intermediate system 136. The intermediate system may be a server or other computer system and is used to improve the convenience and speed of data transfers from camera 102.

Alternatively, cradle 106 may not be used. Rather, power connector 108 and data connector 110 may be directly attached to camera 102. The connectors may be attached separately or combined in a single assembly.

A digital camera 102, according to the present invention, is shown in FIG. 2. Digital camera 102 includes an image sensing apparatus 201, which receives light comprising an image and outputs digital image data representing the image. Image sensing apparatus 201 typically includes a lens 202, which focuses the image onto image sensor 204. Image sensor 204, which is typically a charge-coupled device (CCD) or a complementary metal oxide semiconductor (CMOS) device, outputs a signal representing the image to A/D converter 206, which converts it to digital image data by digitizing the signal, and outputs the digital image data to microprocessor 208. Digital camera 102 also includes sound sensing apparatus 209, which receives sounds, such as speech and outputs digital sound data representing the sound. Microphone 210 senses sounds, typically spoken words, and outputs a signal representing the sensed sounds to A/D converter 212, which digitizes the signal and outputs the digital sound data to microprocessor 208. Microprocessor 208 stores the digital image and sound data in memory 214. Memory 214 is typically semiconductor memory, such as RAM or flash memory. Memory 214 may be built-in to camera 102 or memory 214 may be removable and nonvolatile, such as flash memory cards, or may also be disk storage, such as a floppy disk or other removable media drive, or a hard drive in or attached to digital camera 102.

Digital camera 102 includes I/O adapter 216, which includes connector 217, for transferring data into or out of the camera via data connector 110 and data cable 116. Digital camera 102 also includes power supply 218, which includes a battery, regulating and recharging circuitry and connector 219. This allows digital camera 102 to be powered by power supply 112 via power cable 114 and power connector 108. Other well-known components, such as viewfinder, shutter switch, etc., are not shown.

Microprocessor 208 stores image data for each picture taken in image data block 220 in memory 214. The image data in block 220 is typically compressed to save memory space. Microprocessor 208 stores the recorded voice (speech) data associated with each stored image in recorded voice data block 222. Typically, the recorded voice data is also compressed. Text data associated with each stored image is also stored in memory 214 in recognized text annotation data block 223. The stored text data is generated by performing voice recognition on the recorded voice data, as described below.

It will be seen that any sound may be recorded and stored by digital camera 102, not just speech. The recorded sound will be stored in memory 214 in recorded voice data block 222. The recorded sound will be treated as recorded voice data and voice recognition will be attempted on the recorded sound. In this situation, voice recognition will fail, causing digital camera 102 to recognize that the recorded sound is not voice data. The recorded sound will then be treated not as voice data, but simply as recorded sound data.

In one embodiment, the voice recognition is performed by voice recognition unit 224 using voice recognition data 225. Typically, voice recognition is performed using a digital signal processor (DSP). Use of a DSP allows real-time or near-real time recognition, at significant expense. However, real-time voice recognition is not necessary in the present invention, since recognition is not performed until the camera has been returned to the cradle. Thus, in another embodiment of the present invention, voice recognition unit 224 is not used and voice recognition is performed by microprocessor 208 executing voice recognition routines 226, using voice recognition data 225. This embodiment does not provide real-time recognition, but saves the expense of voice recognition unit 224.

The output of the voice recognition process is text data, which is stored in recognized text annotation data block 223.

Digital camera 102 also includes software routines which are executed by microprocessor 208. Image/voice capture routines 228 control the process of taking digital photographs, recording voice annotations and compressing and storing the data in image data block 220 and recorded sound data block 222. Voice recognition routines 226 control the process of recognizing the voice annotations stored in recorded sound data block 222, generating text annotations and storing them in recognized text annotation data block 223. Data transfer routines 230 control the process of transferring data from digital camera 102.

Voice recognition data 225 is typically stored in RAM built-in to digital camera 102. However, voice recognition data 225 may be stored in removable memory, so that the camera may be customized to recognize particular voices or languages. Software routines 226–230 are typically stored in nonvolatile memory, such as ROM or flash memory.

Figure 3:
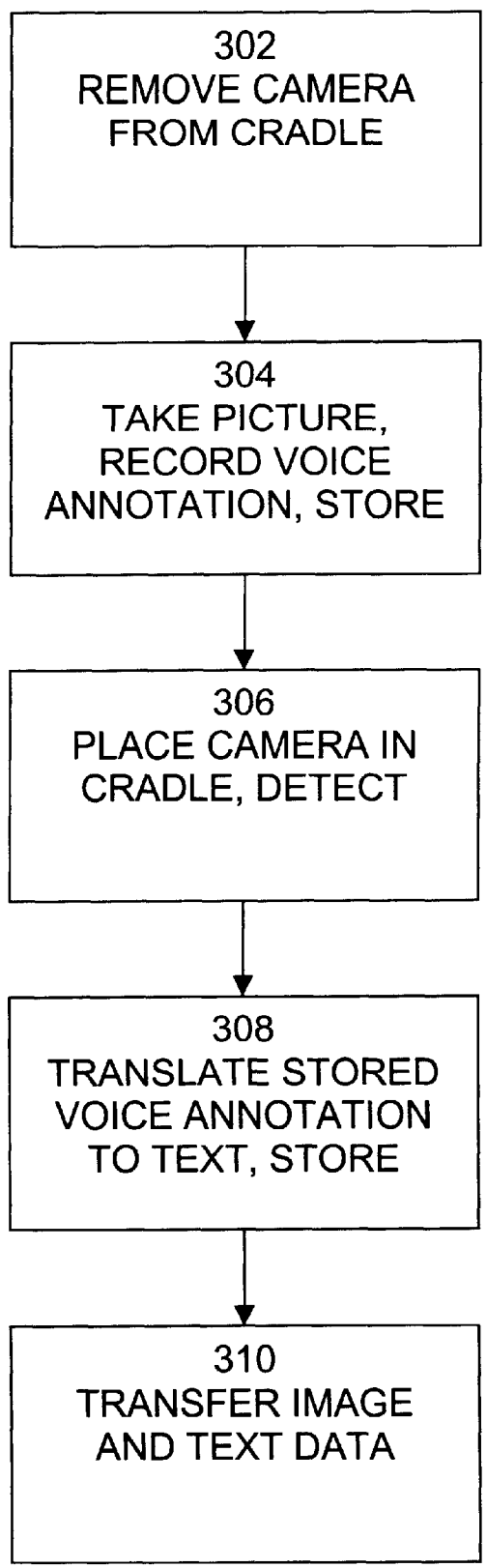
FIG. 3 is a flow diagram of a process of operation of the system shown in FIG. 1.

Digital camera system 100 is operated as shown in FIG. 3. In step 302, the camera is removed from cradle 106. In step 304, the camera is used to take one or more pictures and to record one or more voice annotations. Microprocessor 208 executes image/voice capture routines 228 in order to take each picture, compress the image data, and store the image data in image data block 220 in memory 214. Likewise, microprocessor 208 executes image/voice capture routines 228 in order to record each voice annotation, compress the voice data, and store the voice data in recorded voice data block 222 in memory 214.

Camera 102 may be used to take pictures and record voice annotations until the completion of a picture-taking session. A picture-taking session may be completed because memory 214 has become full, because the battery charge has become low, or because the user has taken the desired pictures. At the completion of the session, in step 306, camera 102 is placed in cradle 106, which causes attachment of both power connector 108 and data connector 110 to camera 102. If cradle 106 is not used, then, at a minimum, power connector 108 must be attached to camera 102. Typically, data connector 110 is also connected at this time, but that is not required.

Microprocessor 208 detects that camera 102 has been provided with external power. The detection may be accomplished by any well-known technique. For example, power supply circuitry 218 may detect the presence of external power on power connector 219 and signal microprocessor 208. Other well-known techniques may also be used.

Upon detecting that camera 102 has been provided with external power, in step 308, microprocessor 208 executes voice recognition routines 226 in order to translate the stored voice annotations to text. The details of the voice recognition routines depend upon the embodiment of digital camera. In an embodiment that includes voice recognition unit 224, microprocessor 208 signals unit 224 to begin voice recognition. Voice recognition unit 224 then translates the stored voice annotations to text using voice recognition data 225 and stores the recognized text in block 223. When voice recognition is completed, voice recognition unit 224 signals completion to microprocessor 208.

In an embodiment that does not include voice recognition unit 224, voice recognition routines 226 include code that cause microprocessor 208 to itself perform the translation of the stored voice annotations to text using voice recognition data 225. Microprocessor 208 also stores the recognized text block 223.

When voice recognition is completed, in step 310, microprocessor 208 transfers the stored image and text data to an attached device via data cable 116, if data connector 110 is attached to camera 102. If data connector 102 is not attached, camera 102 can store the image and text data for later transfer. Alternatively, if memory 214 is removable, the image and text data may be transferred by removing memory 214. The attached device is typically a personal computer or workstation, but may be a local or wide-area network, a server, a mainframe or mini-computer, a communication device, etc.

Voice recognition annotation may be further enhanced by combination with information that modifies the associated annotation. The modifying information may be specified by the user of the camera by manipulating a menu displayed by the camera or by speaking keywords that are recognized as such by the camera. For example, an annotation may be specified as being a description of the picture associated with the annotation, the name of the place depicted, the time the picture was taken, the names of persons depicted, etc. The user may enter information specifying the name, address, e-mail address, etc. of a recipient for each picture or group of pictures. The user may likewise enter different description, place, name, etc. information for each recipient of each picture or group of pictures.

Figure 4:
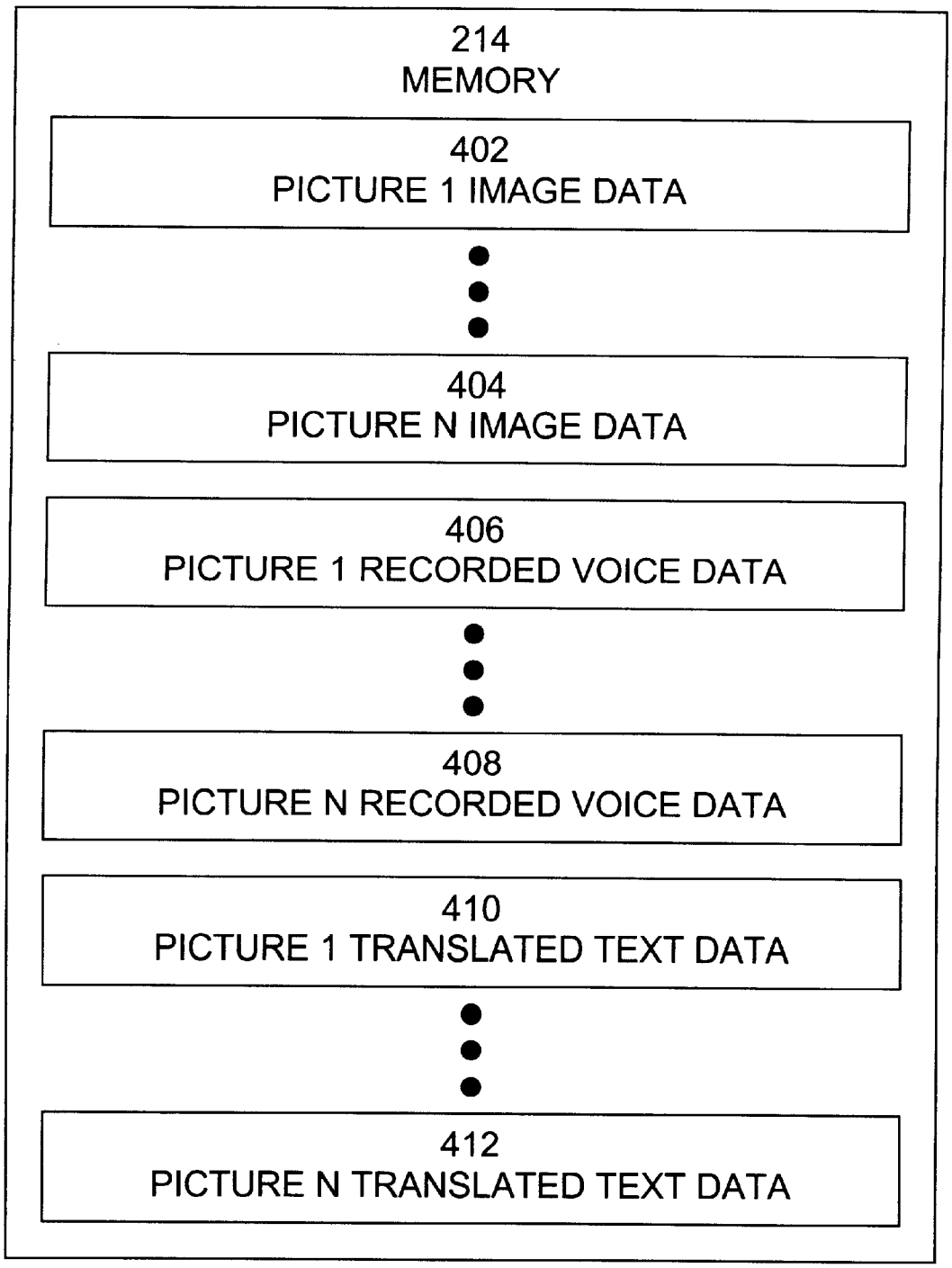
FIG. 4 is an exemplary format of data stored in a memory shown in FIG. 2.

An exemplary format of data stored in memory 214 is shown in FIG. 4. In this example, the image data from each picture taken is stored as a block of image data. For example, the image data from picture 1 is stored in block 402, and the image data from picture N is stored in block 404. All blocks of image data 402–404 are stored contiguously. The recorded voice data associated with each picture taken is stored as a block of recorded voice data. For example, the recorded voice data from the voice annotation associated with picture 1 is stored in block 406, and the recorded voice data from the voice annotation associated with picture N is stored in block 408. All blocks of recorded voice data 406–408 are stored contiguously. The translated text annotation data associated with each picture taken is stored as a block of text data. For example, the translated text annotation data associated with picture 1 is stored in block 410, and the translated text annotation data associated with picture N is stored in block 412. All blocks of translated text annotation data 410–412 are stored contiguously.

Figure 5:
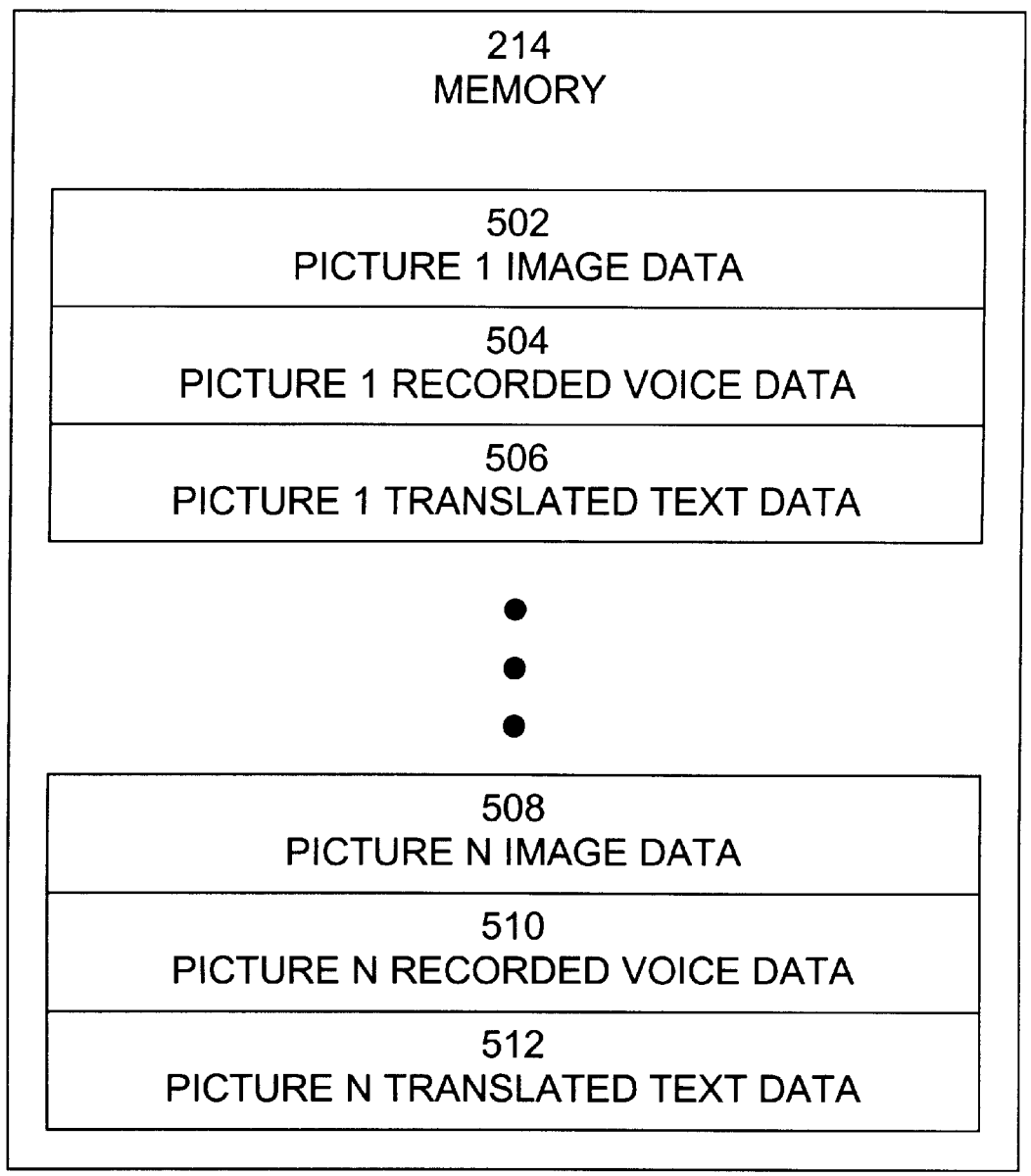
FIG. 5 is another exemplary format of data stored in a memory shown in FIG. 2.

Another exemplary format of data stored in memory 214 is shown in FIG. 5. As in FIG. 4, the image data from each picture, the recorded voice data associated with each picture and the translated text annotation data associated with each picture are each stored as blocks of data. For example, the image data from picture 1 is stored as block 502, the recorded voice data associated with picture 1 is stored as block 504 and the translated text data associated with picture 1 is stored as block 506. However, in this example, the image data from a picture is stored contiguously with the recorded voice data and the translated text data associated with the picture. Thus, blocks 502, 504 and 506, which are all associated with picture 1, are stored contiguously. Likewise, block 508, 510 and 512, which are all associated with picture N, are stored contiguously.

FIGS. 4 and 5 are only two examples of data storage formats that may be used. Any other format that maintains the association among the image data, the recorded voice data and the translated text data may be used as well. For example, a well-known file system may be used.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A digital camera comprising:
an image sensing apparatus operable to receive light comprising an image and output digital image data representing the image as a picture;
a digital memory including first, second, third, and fourth storage areas within the memory;
digital image data stored in the first storage area of the digital memory;
a sound sensing apparatus operable to receive a sound and output sound data representing the sound, wherein the sound is speech and the sound data is voice data;
voice data stored in the second storage area of the digital memory;
text data stored in the third storage area of the digital memory;
a voice recognition apparatus operable to access the second storage area, translate the stored voice data into text data and store the text data in the third storage area, when the digital camera is provided with external power; and
image, voice and text data of a picture stored in contiguous locations in the fourth storage area of the digital memory.

2. The digital camera of claim 1, further comprising an I/O adapter operable to access the first memory and the third memory and transmit the stored image data and the stored text data, when the digital camera is communicatively connected to an external device.

3. The digital camera of claim 1, wherein the image data represents a picture, the voice data represents a voice annotation associated with the picture, and the text data is a text annotation associated with the picture.

4. The digital camera of claim 3, further comprising information that modifies the text annotation.

5. The digital camera of claim 1, further comprises:
a microprocessor within the camera programmed to perform image capture routines, voice recording routines, voice recognition routines and text routines within the microprocessor.

6. The digital camera of claim 5, wherein the microprocessor is further operable to execute data transfer routines.

7. The digital camera of claim 1, wherein external power and communications connections are provided by a cradle assembly for recharging, initiating voice recognition processes and connections to external networks and systems.

8. A method of operating a digital camera comprising the steps of:
receiving light comprising an image and outputting digital image data representing the image;
storing the image data as a picture in a first storage area of a digital memory;
receiving a sound and outputting sound data representing the sound, wherein the sound is speech and the sound data is voice data;
storing the voice data in a second storage area of the digital memory
translating the stored voice data into text data, when the digital camera is supplied with external power;
storing the text data in a third storage area of the digital memory; and
storing the image, voice and text data of each picture in contiguous locations in a fourth storage area of the digital memory.

9. The method of claim 8, further comprising the step of: transmitting the stored image data and the stored text data, when the digital camera is communicatively connected to an external device.

10. The method of claim 8, wherein the image data represents a picture, the voice data represents a voice annotation associated with the picture, and the text data is a text annotation associated with the picture.

11. The digital camera of claim 10, further comprising information that modifies the text annotation.

12. The method of claim 8 further comprising:
performing in a microprocessor within the camera image capture routines, voice recording routines, voice recognition routines and text routines programmed within the microprocessor.

13. The method of claim 12, wherein the microprocessor is further operable to execute data transfer routines.

14. The method of claim 8, further comprising the step of:
providing external power and communications connections with a cradle assembly for recharging, initiating voice recognition processes and connections to external networks and systems.

15. A digital camera comprising:
means for receiving light comprising an image and outputting digital image data representing the image as a picture;
a digital memory having first, second, third and fourth storage areas within the digital memory
means for storing the image data in the first storage area of the digital memory;
means for receiving a sound and outputting sound data representing the sound, wherein the sound is speech and the sound data is voice data;
means for storing the voice data in the second storage area of the digital memory;
means for translating the stored recorded voice data into text data, when the digital camera is supplied with external power;
means for storing text data in the third storage area of the digital memory; and
means for storing image, voice and text data of each picture in contiguous locations in the fourth storage area of the digital memory.

16. The digital camera of claim 15, further comprising:
means for transmitting the stored image data and the stored text data, when the digital camera is communicatively connected to an external device.

17. The digital camera of claim 15, wherein the image data represents a picture, the voice data represents a voice annotation associated with the picture, and the text data is a text annotation associated with the picture.

18. The digital camera of claim 17, further comprising information that modifies the text annotation.

19. The digital camera of claim 15 comprising:
a microprocessor within the camera programmed to perform image capture routines, voice recording routines, voice recognition routines and text routines within the microprocessor.

20. The digital camera of claim 19, wherein the microprocessor is further operable to execute data transfer routines.

21. The digital camera of claim 15, further comprising:
means for providing external power and communications for recharging, initiating voice recognition processes and connections to external networks and systems.

* * * * *